(12) United States Patent
Seebach

(10) Patent No.: US 6,211,316 B1
(45) Date of Patent: Apr. 3, 2001

(54) TADDOL AND TITANIUM (IV) TADDOLATE DENDRIMERS

(75) Inventor: Dieter Seebach, Zürich (CH)

(73) Assignee: Novartis AG, Basel (CH)

( * ) Notice: Subject to any disclaimer, the term of this patent is extended or adjusted under 35 U.S.C. 154(b) by 0 days.

(21) Appl. No.: 08/959,390

(22) Filed: Oct. 28, 1997

(51) Int. Cl.⁷ .................. C08F 134/02; C08F 283/00
(52) U.S. Cl. .................. 526/266; 525/417; 525/902
(58) Field of Search .................. 526/266; 525/417, 525/902

(56) References Cited

PUBLICATIONS

Rheiner et. al. "Book of Abstracts" 214th ACS meeting, Las Vegas, NV, Publisher ACS, Washington DC, Sep. 1997.*
Seebach et. al. "Helv. Chim. Acta", 79(6), pp. 1710–1740, 1996.*
Rheiner et al. "Book of Abstracts" 214th ACS meeting, Las Vegas, NV, Publisher ACS, Washington DC Sep. 1997.*
Seebach et al., "Polymer–and Dendrimer–Bound Ti–TADDOLates in Catalytic (and Stoichiometric) Enantioselective Reactions: Are Pentacoordinate Cationic Ti Complexes the Catalytically Active Species?", Helvetica Chimica Acta, vol. 79, pp. 1710–1740 (1996).
Ito et al., "Preparation and Structural Anaysis of Several New α,α,α,α–Tetraaryl–1,3–dioxolane–4,5–dimethanols (TADDOL's) and TADDOl Analogs, Their Evaluation as Titanium Ligands in the Enantioselective Addition of Methyltitanium and Diethylzinc to Benzaldehyde, and Refinement of the Mechanistic Hypothesis", Helvetica Chimica Acta, vol. 77. pp.2071–2110 (1994).
Seebach et al., "Enantio–and Diastereoselective Titanium–TADDOLate Catalyzed Addition of Diethyl and bis(3–Buten–1–yl) Zinc to Aldehydes, A Full Account with Preparative Details", Tetrahedron, vol. 50, No. 15, pp. 4363–4384 (1994).
Ardoin et al., "Molecular trees: from syntheses towards applications", Bull. Soc. Chim. Fr., vol. 132, pp. 875–909 (1995).
Tomalia et al., "Starbust–Dendrimere: Kontrolle von Grösse, Gestalt, Oberflächenchemie, Topologie and Flexibilität beim Übergang von Atomen zu makroskopischer Materie", Angewandte Chemie, vol. 102, pp. 119–238 (1990).

* cited by examiner

Primary Examiner—David W. Wu
Assistant Examiner—Tanya Zalukaeva
(74) Attorney, Agent, or Firm—David E. Wildman

(57) ABSTRACT

TADDOL dendrimers are described. Their use as crosslinkers in polymerisation reactions and the use of Ti salts of polymer-bound TADDOL dendrimers as catalysts in enantioselective addition reactions is disclosed.

3 Claims, No Drawings

TADDOL AND TITANIUM (IV) TADDOLATE DENDRIMERS

This invention relates to dendrimers of TADDOLs, in particular dendrimers of α,α,α',α'-tetraaryl-1,2-dioxolane-dimethanol, titanium (IV) salts thereof and the use of polymer-bound dendrimer Ti-salts thereof in syntheses involving carbon-carbon bond formation, in particular the catalytic addition of diethylzinc to aldelydes.

It is known to incorporate TADDOL into a crosslinked (divinylbenzene) polystyrene polymer and use the corresponding titanate in addition reactions of diethyl zinc to aldehydes. The known polymer-bound TADDOLs are characterised in that the TADDOL moiety depends from the polystyrene chain through the dioxolane group of said TADDOL.

The polymer-bound TADDOLs are heterogeneous catalysts and are therefore more easily removed from a reaction mixture than a free TADDOL which is homogeneous with a reaction mixture. However, known polymer-bound titanium salts of TADDOLs are less effective than said free titanium salts of TADDOLs at catalysing the aforementioned reactions. There remains a need to provide a polymer-bound TADDOL, the TADDOLate of which is more reactive than the known polymer-bound TADDOLates.

Surprisingly it has now been found that a dendrimer TADDOLate bound to a polymer is more active as a catalyst in carbon-carbon bond-forming reactions, in particular in the catalytic reaction of diethylzinc to aldehydes, than the known polymer-bound TADDOlates.

Accordingly, the invention provides in one of its aspects a dendrimer TADDOL.

TADDOLs and the syntheses for forming same are known in the art see, for example Helvetica Chim. Acta, 77, 2071–2110, (1994) which is incorporated herein by reference. TADDOLs of the present invention may be any of those known in the art, in particular 2-mono- or 2,2-disubstituted at the 1,3-dioxolane group. Substituents at the 2-position may be optionally substituted alkyl, e.g. methyl or ethyl, and optionally substituted phenyl or naphthyl. Said substituents may be substituted with, for example halogen, e.g. Cl Br or F, OH or alkoxy. When the 1,3-dioxolane group is 2,2-disubstituted it is preferably 2,2-dialkyl substituted, more particularly 2,2-dimethyl substituted.

The aryl groups of the preferred TADDOLs may be phenyl, substituted phenyl, naphthyl or substituted naphthyl. Insofar as the aryl groups are substituted, they may be identically or differently substituted.

Dendrimers are known in the art, see for example D. A. Tomalia et. al. Angew. Chem. (1990), 102, 119 and N. Ardoin et. al. Bull. Soc. Chem. Fr. 1995, 132, 875–909 which are incorporated herein by reference. By dendrimer of TADDOL or TADDOLate is meant a macromolecule comprising a central core formed by the aforementioned TADDOL or TADDOLate moiety and depending radially from said core (ususally branched) substituents.

There are many types of dendritic substituents known in the art (see the aforementioned references). Any of the known dendritic substituents may be employed as substituents in the present invention provided that they are unreactive with respect to the reagents used in the catalytic syntheses or do not otherwise interfere with the catalytic effect of the TADDOlate core, for example by sterically crowding the TADDOLate core.

Dendritic substituents may be characterised by their degree of branching. A dendritic substituent may, in fact, not have any branch points in which case it is referred to as a zero (0) generation substituent. More typically however, dendritic substituents have one (first generation), two (second generation) or more branch points, for example up to 10 branch points. Preferred dendritic substituents are one to three generation number substituents, more particularly two or three generation number substituents.

As examples of dendritic substituents there may be mentioned those based on branched hydrocarbon chains, i.e. alkyl or aryl chains, polyethers, e.g. alkyl ethers, aryl ethers or aryl-alkyl ethers, thio ethers or polyamides. Most preferred dendritic substituents are based on dihydroxybenzylbromide, in particular 3,5-dihydroxybenzylbromide, the branched substituent thereby being created using an iterative synthetic process of reacting said benzyl bromide moiety of one molecule with the hydroxy substituents of another molecule until a substituent of the desired generation number is obtained.

Dendrimers according to the invention may bear terminal functional groups which can react with appropriate functionality of a polymer (or a monomer unit thereof) in order to bind said dendrimer to a polymer support.

Preferably said functionality is an unsaturated group, more preferably an alkene group, e.g. vinyl group or a styryl group. The terminal functional groups may be connected to the dendrimer chain according to known processes, for example as an end-capping step as part of the iterative process discussed above.

Preferred dendrimer TADDOLs have only one dendritic substituent attached to each aryl group. the dendritic substituents may be connected to the aryl groups by a carbon-carbon bond or a carbon-heteroatom bond, e.g. carbon-oxygen, carbon-nitrogen or carbon-sulphur bond. Preferably the dendritic substituents are attached to the aryl groups through a carbon-oxygen bond.

Dendritic substituents useful in the invention may be made according to syntheses known in the art (see the aforementioned references which are incorporated herein by reference).

The invention provides in another of its aspects a dendrimer of α,α,α',α'-tetraaryl-1,3-dioxolane-4,5-dimethanolate of titanium (IV) hereinafter referred to as a dendrimer TADDOLate.

The source of titanium (IV) may be any of the known alkyl, aryl or alkoxy titanium complexes known in the art. A preferred source of titanium (IV) are tetra alkoxy titanates, more particularly tetraisopropyloxy titanate. TADDOLates may be 1:1 complexes, that is one TADDOL ligand complexed to one titanium atom, or a 2:1 complex wherein two TADDOL ligands are complexed with one titanium atom. 1:1 TADDOLates are preferred. A more preferred titanium TADDOLate is the diisopropoxy-Ti-TADDOLate.

The insertion of the Ti atom into the TADDOL core may be carried out according to known syntheses. Preferred reaction conditions for forming a TADDOL-titanate are described in Tetrahedron 50 4363–4384 (1984) which is incorporated herein by reference.

A more preferred dendrimer TADDOLate has dendritic substituents based on dihydroxybenzylbromide, in particular 3,5-dihydroxybenzylbromide. More preferably the TADDOLate is a 2- or 3-generation number dendrimer, in particular, being terminally substituted with an unsaturated group, e.g a vinyl group or a styryl group. The most preferred dendrimer TADDOLate are the preferred dendrimers aforementioned with one dendritic substituent attached to each aryl group of the TADDOLate core.

In another aspect of the invention there is provided a polymer cross-linked with a TADDOL or TADDOLate as hereinabove described.

Polymers according to the invention may be made up of any suitable monomeric units at least some of which will react with the terminal unsaturated groups of the dendritically substituted TADDOLs or TADDOLates. The terminal unsaturation of the dendrimers may react with other said monomeric units in a copolymerisation reaction thereby becoming incorporated into the polymer chain. Alternatively, the terminal unsaturation may react with functionality depending from said other monomeric units or a polymer formed from said monomeric units thereby forming chains depending from the polymer or copolymer backbone. However the terminal unsaturation reacts with the respective monomeric units or polymers formed therefrom, when two or more of the dendritic substituents bearing terminal unsaturated units of the dendrimer TADDOL interact with the polymer the dendrimer essentially acts as a crosslinker for the polymer.

Preferably the unsaturated terminal groups of the dendrimer TADDOL take part in a copolymerisation with styrene. The polymerisation reaction may be carried out according to known synthetic methods. The amount of dendrimer TADDOL employed relative to the amounts of styrene will depend upon the degree of crosslinking required in order to achieve the desired physical properties of the resultant polymer. Polymers with differing physical properties may be obtained by routine experimentation.

In another aspect of the invention there is provided a polymer-bound dendrimer TADDOL or its TADDOLate of titanium (IV).

Polymer-bound dendrimers TADDOLs and TADDOLates of titanium (IV) may be in the form of particles, e.g. beads or granules. The particle size of said beads or granules may be about 0.25 to 0.4 mm, more preferably 0.3 mm.

The loading of a dendrimer TADDOLate of titanium (IV) on the polymer may be in the range of about 0.5 to 1.0 mmol per gram of polymer, more preferably 0.6 to 0.7 mmol, in particular 0.63 mmol per gram of polymer.

Whilst the dendrimer TADDOL ate of titanium may be formed prior to binding to a polymer as described hereinabove it is preferred that polymer-bound dendrimer TADDOLs are converted to the corresponding polymer-bound TADDOLate according to substantially the same synthetic procedure used to convert non-polymer-bound TADDOLs to the corresponding TADDOLates.

Polymer-bound dendrimer TADDOLates may be formed by treating direct beads of polymer-bound TADDOL with, for example tetraisopropyloxy titanate in an organic solvent, e.g. toluene according to conventional methods.

A by-product of the reaction of the preferred titanium-containing reagent, isopropyl alcohol, may be azeotropically removed to give the titanium loaded polymer beads.

In another aspect of the invention there is provided the use of a polymer-bound dendrimer TADDOLate of titanium (IV) as hereinabove described (hereinafter referred to as pb-Ti-TADDOLate) in catalytic or stoichiometric synthetic transformations.

Said transformations may be any of those previously effected by using homogeneous TADDOLate catalysts or known polymer-bound TADDOLates, for example additions to carbonyl compounds, Diels-Alder reactions and desymmetrisation of meso compounds.

In particular, the pb-Ti-TADDOLate of the invention is useful in the catalytic enantioselective nucleophilic addition to carbonyl compounds, more particularly the nucleophilic addition of dialkylzinc, e.g. diethyl zinc to carbonyl compounds, in particular aldehydes, e.g. benzaldehyde.

The catalysis of the reaction between diethyl zinc and benzaldehyde using a pb-Ti-TADDOLate of the invention may be carried out under known conditions for effecting metal mediated transformation of benzaldehyde using diethyl zinc (See Helvetica Chim. Acta (1996) 79, 1710 which is incorporated herein by reference).

pb-Ti-TADDOLate, when used catalytically in the aforementioned synthetic transformations, e.g. the reaction of diethylzinc with benzaldehyde may be present in amounts of up to 0.2 equivalent based on an equivalent of either one of the reactants.

The nucleophilic addition of diethylzinc to carbonyl compounds, e.g. addition of diethylzinc to benzaldehyde proceeds with yields and enantioselectivity which is comparable to reactions using homogenous Ti-TADDOLate catalysis known in the art.

In the particular reaction of diethylzinc with benzaldehyde yields are obtained of up to 98% with enantioselectivity in the order of an er. (S:R) of 98:2.

Surprisingly we have found that the enantioselectivity decreases with increased TADDOLate content in the polymer-bound dendrimers. A preferred polymer-bound dendrimer is a first generation number dendrimer formed from copolymerisation of styrene:dendrimer TADDOL or TADDOLate in a mole ratio of 20:1.

Further we have surprisingly found that activity of the pb-Ti-TADDOLate differs according to the generation number of the polymer, thus for example, 2nd generation number pb-Ti-TADDOLate may not be more effective than 1st generation number pb-Ti-TADDOLate and 3rd generation numbers and higher may be increasingly less active. In a preferred embodiment of the invention the dendrimers are first generation number dendrimers.

Reaction times of syntheses using pb-Ti-TADDOLate according to the invention, whilst being slower when compared to homogenous catalysis with the corresponding TADDOLate, nevertheless are substantially faster than conventional polymer-bound TADDOLate catalysed reactions.

pb-Ti-TADDOLate, however, possess advantages over homogenous catalysis, for example ease of separation from the reactant (consequently they are easily re-usable and potentially toxic and expensive materials can be isolated from the reaction mixture). Furthermore, the pb-Ti-TADDOLate can be used many times, e.g. as much as 20 times, e.g 10 to 15 times without significantly affecting yield or enantioselectivity.

A potential problem associated with using polymer-bound catalysts is that the catalyst, usually formed as polymer beads or granules, tend to be physically degraded as a result of abrasion from constant agitation of the reaction mixture. The polymer eventually may be reduced to a fine powder which may no longer be easily removed from the reaction mixture.

Surprisingly we have now found that if the polymer beads or granules may be contained within a mesh within a reaction vessel the aforementioned physical degradation of the polymer beads is essentially prevented.

Furthermore, despite the fact that the mesh contains the polymer-bound catalyst within a relatively small area of the reaction vessel, nevertheless, there would appear to be sufficient reaction circulation through the mesh in contact with the polymer-bound catalyst that yields, reaction time, and enantioselectivity are not substantially affected compared with the non-constrained polymer-bound catalyst.

The mesh may be in the shape of a "tea bag" wherein two essentially disc-shaped meshes are arranged such that they sandwich the polymer beads or granules and thereafter the edges of the disc-shaped meshes are sealed to form a pouch containing the polymer beads or granules.

The mesh may be formed of any suitable inert material, for example polypropylene. The mesh size may be sufficiently small to prevent polymer beads or granules from passing through the mesh and will depend upon the size of the polymer beads or granules. Typically the mesh size may be 0.3 to 0.05 mm, e.g.0.1 mm.

The mesh may be fixed so as to be immobilised within a reaction vessel. Suitable fixing means may be provided by sandwiching the mesh between two grills, e.g. glass grills which abut the inner wall of a reaction vessel.

There now follows a series of examples which serve to illustrate the invention.

EXAMPLE 1

Syntheses

1. Preparation of the TADDOL (4R, 5R)-2,2-Dimethyl-α,α,α',α'-tetra(p-hydroxyphenyl)-1,3-dioxolan-4,5-dimethanol (1)

A 1 L flask under an atmosphere of Argon is charged with a solution of 83.5 g (0.48 mol) p-bromophenol in THF (600 ml). To this solution is added with stirring 49.3 g (0.72 mol, 1.5 eq) of imidazole. The resultant solution is cooled with an ice bath before adding 80.0 g (0.053 mol, 1.1 eq.) of TBDMSCl. After addition, the mixture is allowed to warm to room temperature whereupon the mixture is left to stir for 20 hours. Thereafter, diethylether (800 ml) and water (200 ml) is added to the mixture and the organic phase is extracted, washed with water (3×500 ml) and dried over $MgSO_4$ to yield a yellow oil. The yellow oil is distilled under vacuum 129° C., 0.2 torr.) to yield 139 g (97.2% of a clear oil (TBDMS-protected phenol 1A).

In a 1 L flask under Argon is placed 6.1 g (244 mmol, 5 eq.) of magnesium turnings and a single iodine crystal. 70.0 g (244 mmol, 5 eq) 1A in THF (70 ml) is added slowly to the flask over a thirty minute period. The resultant brown solution is stirred for a further 1 hour. Thereafter, 12.0 g (48.7 mmol) of (4R, 5R)-2,2-dimethyl-1,3-dioxolane-4,5-dicarboxylicethylester in THF (70 ml) is slowly added to the solution. The resultant mixture is stirred for 3 hours whereupon a brown suspension is formed. The crude reaction mixture is worked-up by adding 240 ml $NH_4Cl$ and 350 ml water (both cooled by means of an ice bath) and diethylether (750 ml). The organic phase is collected and the aqueous phase is washed with diethyl ether (3×500 ml). The organic phases are collected and combined and washed with NaCl solution (2×500 ml). Thereafter the organic phase is dried over $MgSO_4$ and evaporated to dryness to yield a brown oil (56.5 g). To this oil is added diethylether (150 ml) and methanol (200 ml) as a recrystallising solvent. The crude product is left to recrystallise over night whereupon 30.5 g (63%) of white crystals of (4R, 5R)-2,2-dimethyl-α,α,α',α'-tetra(4tert-butyldimethylsiloxyphenyl)-1,3dioxolane-4,5-dimethanol (1B) are obtained.

A 1 L flask is charged with 16.3 (16.5 mmol) of (1B) in THF (310 ml) under an atmosphere of Argon. The solution is cooled to 0° C. with an ice bath and 20.8 g (66 mmol, 4 eq) of TBAF is added. The resultant mixture is allowed to warm to room temperature and is thereafter stirred for a further 48 hours whereupon a dark red reaction mixture is obtained. To the reaction mixture is added water (300 ml) and diethylether (3×500 ml) and the organic phases are collected and combined, dried over $MgSO_4$ and evaporated to dryness to yield an orange solution (8.5 g, 97%) from which light-orange coloured crystals precipitate. The crude product was dissolved in a dichloromethane/methanol mixture (10:1) and filtered through kieselgel. The solution was left to crystallise. A fine orange powder was obtained (6.5 g, 82.2%) of (1).

2. Synthesis of first-generation number dendritic substituent-3,5 Di(4-vinyl benzyloxy)benzylbromide (2)

A 2 L flask is charged with 37.8 g (224.6 mmol) of 3,5-dihydroxy benzoate in acetone (900 ml) under an Argon atmosphere. To this solution is added 80 g (471.8 mmol, 2.1 eq) of 4-vinylbenzyl chloride. Thereafter, 11.7 g (45 mmol, 0.2 eq) of 18-C-6 and 65.2 g (655 mmol, 2.2 eq) of $K_2CO_3$ is added. The resultant yellow mixture is stirred gently at 60° C. for 40 hours. Thereafter, the solution is filtered to provide a brownish filtrate and a yellowish filtercake. Diethylether (800 ml) and water (500 ml) are added to the solution and the organic phase collected. The water phase is further extracted with diethylether (500 ml) and methylene chloride (500 ml). The organic phases are collected, and combined, dried over $MgSO_4$ and evaporated to dryness. A brown-orange oil is obtained and suspended therein, some white particulate matter. The oil is dissolved in acetone and hexane is added to effect recrystallisation. White crystals are formed (76.9 g, 85.5%) of 3,5-di(4-vinylbenzyloxy)benzoate (2A).

A 1 L flask is charged with 10.0 g (268.6 mmol, 2.3 eq) of $LiAlH_4$ in THF (250 ml) under an argon atmosphere. The resultant solution is cooled with an ice bath and 46.9 g (116.9 mmol) of ester (2A) in THF (250 ml) is added dropwise with stirring and the mixture, stirred over a 2 hour period. Thereafter water (10 ml) and 15% NaOH (10 ml) and finally water (24 ml) is added to the mixture. The grey precipitate is filtered and the filtrate is washed with diethylether. Thereafter water (500 ml) is added and the organic phase is collected. The remaining aqueous phase is further extracted with diethylether (3×500 ml) and the organic phases are collected and combined, dried over $MgSO_4$ and evaporated to dryness. A colourless oil is obtained (38.7 g, 88.5%). Addition of a little hexane effects precipitation of white crystals of 3,5-di(4-vinylbenzyloxy)benzylalcohol (2B). A 1 L flask is charged with 64.5 g (173 mmol) of (2B) in THF (250 ml) under an argon atmosphere. Thereafter, 68.1 g (260 mmol, 1.5 eq) of $PPh_3$ and then 86.2 g (260 mmol, 1.5 eq) of $CBr_4$ are added and the resultant mixture stirred gently for 1 hour in an ice bath whereupon a milky suspension is obtained. To this suspension is added water (600 ml) and diethylether (400 ml). The organic phase is collected and the aqueous phase is further extracted with diethylether (2×500 ml). The organic phases are collected and combined, dried over $MgSO_4$ and evaporated to dryness. A yellow oil is obtained which is dissolved in hexane/acetone 9:1 and filtered over Kieselgel. The resultant solution is left to recrystallise to yield fine white crystals of 3,5-di(4-vinylbenzyloxy)benzylbromide (2).

3. Synthesis of a second generation number dendritic substituent 3,5-di(3,5-di(4-vinylbenzyloxy)benzyloxy)benzylalcohol (3A)

A 250 ml flask is charged with 15 g (34.5 mmol, 2.2 eq) of bromide (2) and acetone (100 ml) under an argon atmosphere. To this solution is added 3,5-dihydroxybenzyl alcohol (2.2 g, 15.7 mmol), 0.82 g (31. mmol, 0.2 eq) 18-C-6 and 4.77 g (34-5 mmol, 2.2 eq) of $K_2CO_3$ and the mixture is stirred for 48 hours whereupon a yellow suspension is formed. To the mixture is added methylene chloride (200 ml) and water (200 ml). The organic phase is separated, dried over $MgSO_4$ and evaporated to dryness. A dark brown oil is obtained which is dissolved in toluene (40 ml) and hexane (20 ml). Upon cooling, a white powder forms which is collected by filtration to give 10.92 g (81.9% of (3A).

3A is converted to the corresponding bromide (3B) by following substantially the same procedure as described above in the formulation of 2.

4. Synthesis of a dendrimer TADDOL (4R,5R)-2,2-dimethyl-α,α,α',α'-tetra(4-(3,5-di(4-vinylbenzyloxy)benzyloxy)phenyl)-1,3-dioxolane-4,5-dimethanol (4)

A 50 ml flask is charged with 0.305 g (0.58 mmol) of (1) in acetone 20 ml) under an atmosphere of argon. A solution of the bromide (3B) 1.0 g (2.3 mmol, 4 eq) in acetone (5 ml) is added dropwise. To this mixture is added 0.32 g $K_2CO_3$ (2.3 mmol, 4 eq). A light yellow suspension thus formed is stirred for 40 hours. Thereafter the mixture is filtered to remove $K_2CO_3$ and washed with methylene chloride.

The organic phase is collected and the aqueous phase is further extracted with methylene chloride (2×100 ml). The organic phases are combined, dried over $MgSO_4$ and evaporated to dryness leave a yellow oil (1.2 g) which was further evaporated under vacuum, dissolved in methylene chloride (100 ml), filtered over Kieselgel, and further evaporated to leave a white product (0.72 g) 64.3% of (4).

(4) is a second generation number TADDOL dendrimer. A first generation number TADDOL (4A) is formed by following essentially the same procedure as for (4) only substituting bromide (3B) with bromide (2).

5. Copolymerisation of Styrene and dendrimer TADDOL-(4)

The styrene and TADDOL dendrimer (4) are reacted in an 8:1 wt/wt ratio: 30 mg of polyvinyl alcohol (PVA) (100,000 Mw, 86–89% hydrolyzed, FLUKA) and water (8 ml) is warmed to 40 to 50° C. and filtered through a G1-glass filter. A 100 ml flask equipped with cooler and stirrer is charged with the respective amounts of TADDOL dendrimer (4) and styrene, 16.4 mg (0.1 mmol) AlBN, 3 ml benzene and 1 ml of THF. The resultant PVA mixture is stirred at room temperature at 750 rpm to form a suspension. The suspension was heated to 90° C. in an oil bath and stirred at 750 rpm at this temperature for 40 hours under an argon atmosphere. After 30 minutes the suspension is observed to change colour from light yellow to white. The resultant suspension is cooled to room temperature and filtered over a G2 glass filter. The filtrate is added to water (200 ml) for washing. Thereafter, the mixture is washed with hot water (75 ml), methanol/water 1:1 (50 ml) and finally pentane (50 ml). After drying at high vacuum the copolymer is obtained as fine white particles.

EXAMPLE 2

Dendrimer TADDOLate-mediated Reaction of Diethylzinc and Benzaldehyde

A 50 ml flask is charged with 0.2 mmol of polymer-bound dendrimer TADDOL (4) (0.02 eq) in 10 ml of toluene and 60 μL (0.2 mmol, 0.02 eq) of (i-$PrO_4$) Ti under argon to form a yellow solution. The mixture is stirred at room temperature for 3 hours before being dried under high vacuum. Thereafter a further 5 ml of toluene is added to the mixture and the solution cooled to −30° C. To the cooled solution is added benzaldehyde (1.0 ml, 10 mmol, 1 eq), 300 μL (1 mmol, 0.1 eq) (i-$PrO_4$)Ti and diethylzinc (9 ml, 2 M in toluene). After stirring the mixture at −30° C., for 16 hours $NH_4Cl$ (30 ml) is added and the mixture is warmed to room temperature. The mixture is filtered and washed well with diethylether. The organic phase is washed with water and collected. The aqueous washings are further extracted with diethyl ether (2×100 ml) and the organic phases are combined, dried over $MgSO_4$ and evaporated to dryness to yield a light yellow oil of the addition product.

The polymer-bound TADDOLate dendrimer gave yields of greater than 95% after only 0.5 hours and essentially quantitative yields after only one hour. The addition product was obtained with an enantiomeric ratio (S:R) of 98:2.

When a non-dendrimer polymer-bound TADDOL (a polystyrene polymer attached to the 1:1 diisopropoxytitanium complex of TADDOL (4R,5R)-2,2-dimethyl-α,α,α',α'-tetraphenyl-1,3-dioxolane-4,5-dimethanol) was employed as the catalyst, the reaction was only 70% complete after 3 hours and the addition product was obtained with an enantiomeric ratio (S:R) of 93:7.

What is claimed is:

1. A dendrimer comprising a member selected from the group consisting of an α,α,α',α'-tetraaryl-1,3-dioxolane-4,5-dimethanol moiety and an α,α,α',α'-tetraaryl-1,3-dioxolane-4,5-dimethanolate of titanium (IV) moiety, said moiety comprising a dendritic substituent, wherein said dendritic substituent is bound to an α or an α' aryl group.

2. The dendrimer of claim 1, wherein said dendritic substituent comprises a peripheral styryl group.

3. The dendrimer according to claim 2 comprising 8 to 16 peripheral styryl groups.

\* \* \* \* \*